C. W. H. BLOOD AND C. G. OSTEMAN.
SIDE HEAD CONSTRUCTION FOR MATCHERS AND THE LIKE.
APPLICATION FILED JULY 7, 1920.
1,414,618.
Patented May 2, 1922.
3 SHEETS—SHEET 3.
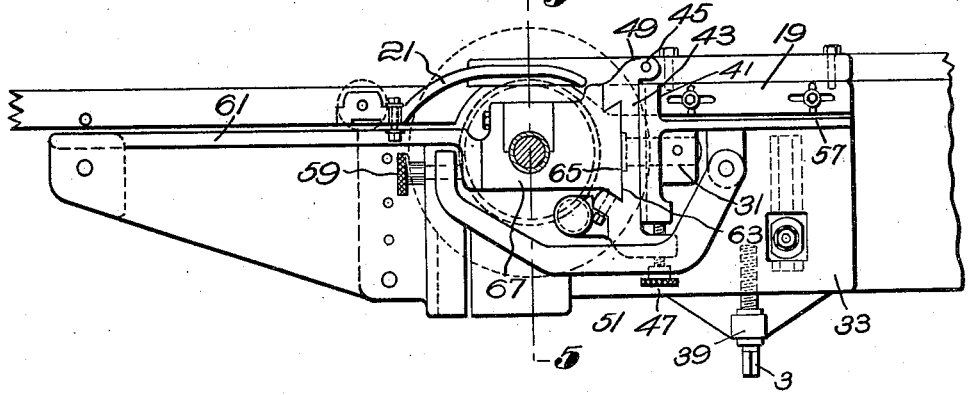
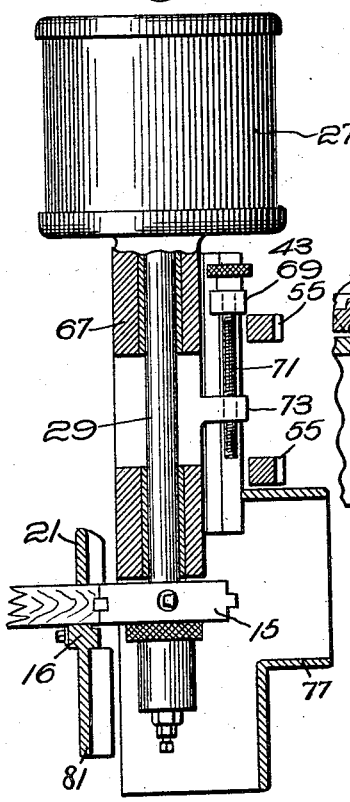
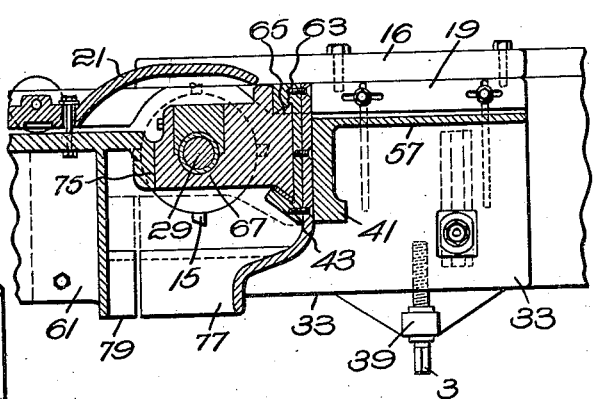
Inventors:
Charles W. H. Blood,
Carl G. Osteman,
by Emery, Booth, Janney & Varney
Attys.

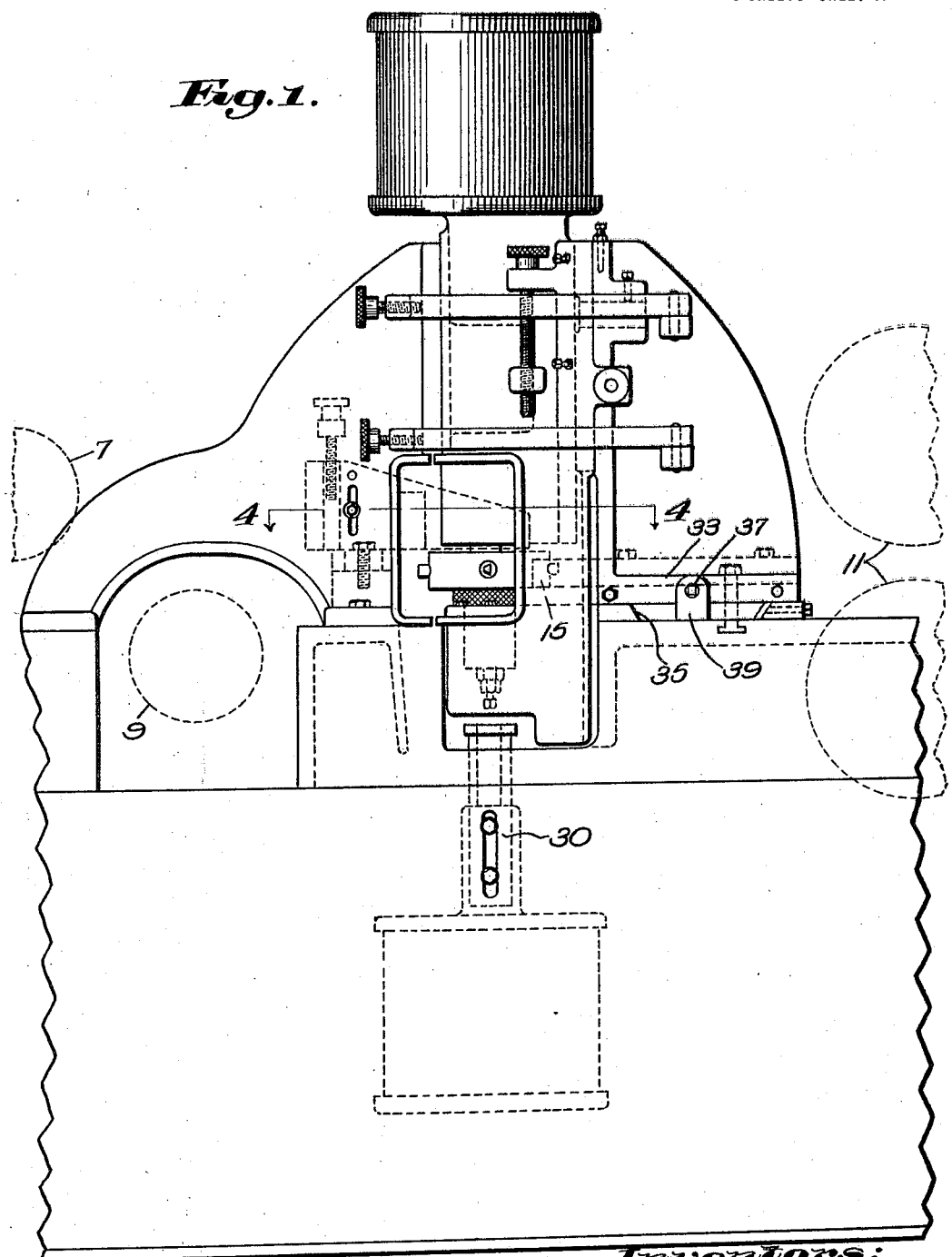

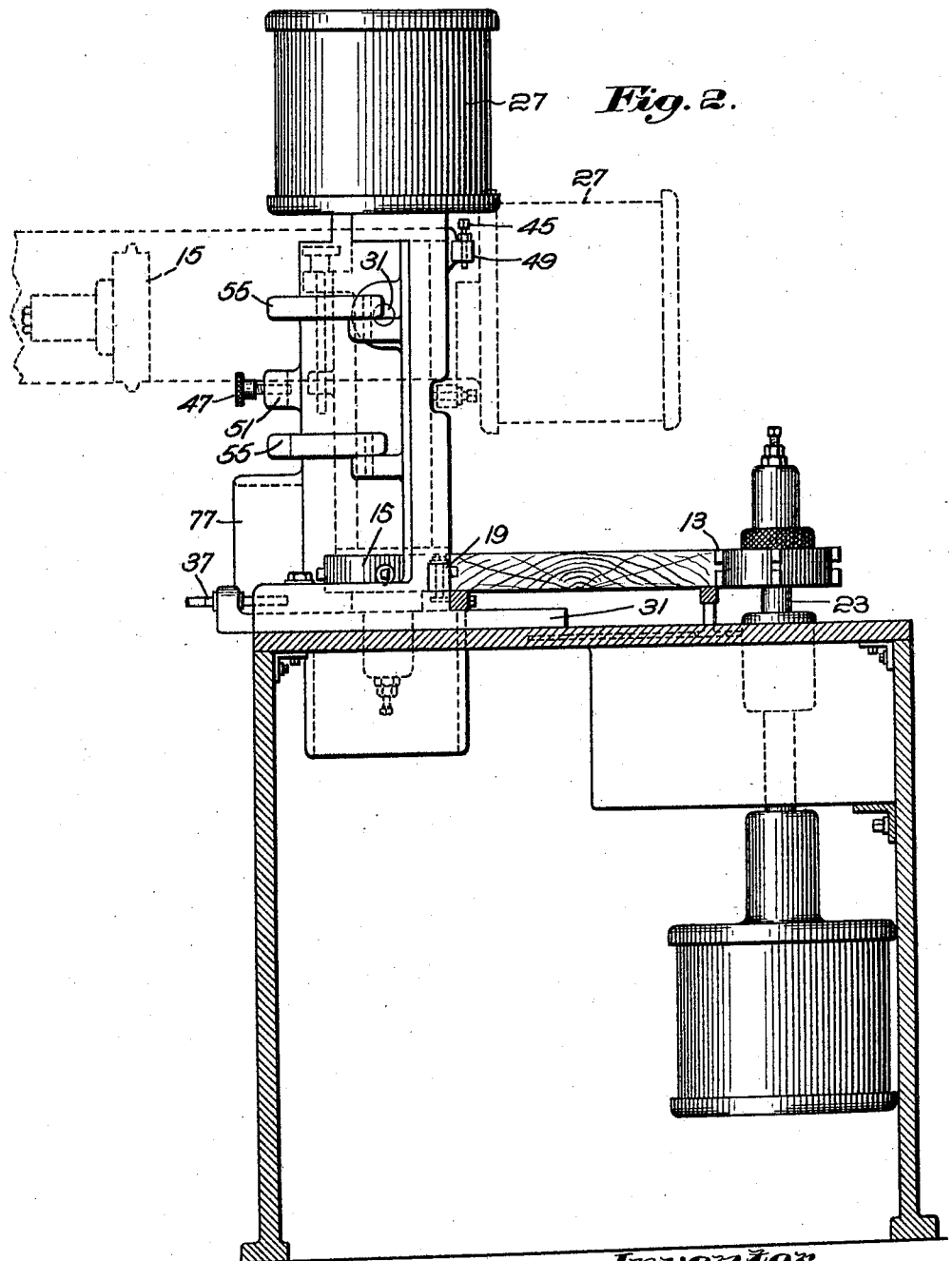

UNITED STATES PATENT OFFICE.

CHARLES W. H. BLOOD, OF WINTHROP, AND CARL G. OSTEMAN, OF BOSTON, MASSACHUSETTS, ASSIGNORS TO S. A. WOODS MACHINE COMPANY, OF BOSTON, MASSACHUSETTS, A CORPORATION OF MASSACHUSETTS.

SIDE HEAD CONSTRUCTION FOR MATCHERS AND THE LIKE.

1,414,618.   Specification of Letters Patent.   Patented May 2, 1922.

Application filed July 7, 1920. Serial No. 394,451.

*To all whom it may concern:*

Be it known that we, CHARLES W. H. BLOOD and CARL G. OSTEMAN, citizens of the United States, and residents of Winthrop and Boston, respectively, in the county of Suffolk and State of Massachusetts, have invented an Improvement in Side Head Construction for Matchers and the like, of which the following description, in connection with the accompanying drawings, is a specification, like characters on the drawings representing like parts.

This invention relates to machines having rotary tools directly driven by rotary motors. In its more specific aspects it has to do with a construction applicable to the side heads of matchers or like wood working machines.

Our invention may best be understood by reference to the following description of the illustrative embodiment thereof shown in the accompanying drawings wherein we have shown by way of example as much of a matcher as is necessary to an understanding of our improvements as applied thereto and wherein:

Fig. 1 is a partly diagrammatic side elevation of a portion of a matcher;

Fig. 2 is a transverse section adjacent the side heads;

Fig. 3 is a plan of the mechanism of one of the side heads, the motor casing being omitted;

Fig. 4 is a section on the line 4—4 of Fig. 1; and

Fig. 5 is an end elevation of one of the heads and adjacent mechanism partly in section along the line 5—5 of Fig. 3.

In the accompanying drawings as an example of our invention we have shown a matcher wherein the side heads are directly driven by electric motors. In Fig. 1 we illustrate diagrammatically the upper and lower cutter heads 7 and 9 adapted to act on the upper and lower faces of a board passing through the machine. From the cutter heads 7 and 9 the board passes between the side heads to the feed rolls 11. As best shown in Fig. 2 the two side heads 13 and 15 rotate on vertical spindles in a plane just about the bed of the machine and act simultaneously on opposite edges of the board which passes over the supports 16 in contact with the guide 19 and under the holding down device 21.

Referring to Fig. 2, the head 13 is mounted on the upwardly projecting rotor 23 of an electric motor 25 mounted beneath the bed of the machine. Any ordinary or usual adjustments for positioning the head 13 may be provided but as these adjustments need not be essentially different in principle or form from the adjustments used with belt driven heads, we have not thought it necessary to attempt to show or describe them in detail.

In a matcher the two heads should be directly opposite each other transversely of the machine. The transverse dimensions of the machine are too restricted to permit a second motor to be placed side by side with the motor 25 while maintaining the alignment of the two heads. In accordance with our invention we provide for driving the cutter head 15 by an electric motor 27 which is placed above the bed of the machine with the rotor 29 thereof depending vertically to hold the cutter head in operative position above the bed of the machine and opposite the cutter head 13. A bracket 30 may be provided beneath the cutter head to prevent it from crashing to the floor in case of accident.

The arrangement of driving motors for a cutter head as so far described we have disclosed and claimed elsewhere. The present invention has more particularly to do with the manner whereby the motor 27 is mounted in its inverted position with provision for desired adjustments of the cutter head and in such a way that the cutter head may be moved away from the bed of the machine to give access thereto for changing the same or for jointing (grinding) it. Briefly to summarize the construction shown we provide, as best shown in Fig. 2 for swinging the motor with the attached cutter head about a substantially horizontal pivot 31 to more or less horizontal position, as indicated in dotted lines, so that the cutter head 15 is suspended adjacent the side of the machine at a distance from the other mechanism and in a position where it may be readily removed to permit cutter heads to be changed or wherein it may be revolved in contact with a jointing mechanism.

Referring to the drawings we have there shown the entire side head mechanism carried by a base member 33 adjustable transversely of the machine on the dovetailed guideway 35, the adjustment being effected by a screw 37 swivelled in bracket 39 and entering the base plate 33. The base plate 33 carries a standard 41 to which the motor may be secured by means of a motor support 43 having the trunnion stud 31 journalled in the standard 41. By this construction the motor support 43 may be pivoted around a horizontal axis to bring the parts to the dotted line position in Fig. 1. Suitable stop means in the form of screws 45 and 47 tapping into lugs 49 and 51 on the motor support 43 and making contact with the standard 41 at the extremes of movement of the support may be provided. Herein the screw 47 is provided with a large head in the nature of a hand wheel permitting relatively slight angular adjustment of the motor and its support adjacent the vertical position thereof.

For clamping the motor with the cutter head in its operative position latch arms 55 may be pivoted to the web 57 connecting the standard 41 to the base plate 33 and these arms carry at their opposite ends screws 59 provided with large heads in the nature of hand wheels which may be set up against the flange of the frame member 61 rising from the bed of the machine on the opposite side of the motor.

In the example of the invention here shown the cutter head also has a vertical adjustment and for this purpose (see Figs. 1 and 5) the motor support 43 is provided with a dovetailed guideway 63 in which slides the dovetailed rib 65 provided on the motor carrier 67. The support 43 is provided with a lug 69 receiving the adjusting screw 71 which taps into a lug 73 on the carrier 67 and thus provides for vertical adjustment of the motor in the dovetailed guideway.

Referring to Figs. 3 and 4, the member 61 may be provided with a suitable abutment surface 75 supporting the motor on the side opposite the trunnion bolt 31.

The motor support 43 has conveniently formed thereon or attached thereto the partial housing member 77 (see Figs. 4 and 5) which when the motor is swung inwardly to operative position mates with the partial housing member 79 on the member 61 and provides in cooperation with the member 21 and the flange 81 depending from support 16 an angular chip hood or flue about the cutter head.

The construction herein disclosed is in some respects similar to that disclosed in my copending application Serial No. 394,450, filed July 7, 1920, and in that application I have claimed generically certain principles embodied in the construction shown in the present application. This present application is subsidiary to the one referred to and herein I claim only a construction wherein the side leg is mounted for movement about a substantially horizontal axis to bring the cutter head to an inoperative position. Generic claims covering such a mechanism among others have been presented in my copending application referred to.

Having thus described in detail the illustrative embodiment of our invention shown by way of example in the accompanying drawings, what we claim as new and desire to secure by Letters Patent we shall express in the following claims.

1. A matcher or like machine comprising the usual horizontal bed, opposed rotary tools operating substantially in the plane of said bed and rotary motors directly coupled thereto and disposed respectively above and below the plane, the former having a pivotal mounting on a substantially horizontal axis remote from and above the tool providing an inward position in which the tool is adapted to operate on work passing over the bed and adapted to be swung through a wide arc to a substantially horizontal position wherein the tool is distant from the bed of the machine and of convenient access.

2. A matcher or like machine comprising the usual horizontal bed and a side leg which includes a motor having a depending rotor for receiving the cutter head to support the head adjacent the bed for operation on work passing thereover, said motor being pivoted on a substantially horizontal axis remote from and above said bed providing for swinging the head through a wide arc to an inoperative position remote from the bed.

3. A matcher or like machine comprising the usual horizontal bed and a side leg comprising a base adjustable transversely of the machine, a standard rising therefrom, a motor support pivoted to the standard on a substantially horizontal axis, means for clamping the support to hold the motor with its rotor depending to support the side head in operative position to act on work passing over said bed, said support being swingable about the pivot on release of the clamping means to carry the head to an inoperative position distant from the bed.

4. A matcher or like machine comprising the usual horizontal bed and a side leg comprising a standard, a motor support pivoted on the standard to swing about a substantially horizontal axis, abutments limiting said movement and providing an inward position in which the motor is supported with depending rotor to hold the side head in operative position to act on work passing over the bed and an outward position wherein the head is swung upwardly through a wide arc to an inoperative position remote from the bed and means cooperating with one of the abutments to effect adjustment of the inward position by relatively slight swinging movement of the support about its pivot.

5. A matcher or like machine comprising the usual horizontal bed and a side leg including a standard, a motor support pivoted thereon by means of a horizontal stud at one side of the support, a motor carrier on said support with provision for vertical adjustment thereon and adapted to hold a motor with depending rotor to receive a cutter head in operative position to act on work passing over said bed, swinging of the support on its pivot providing for lifting the cutter head through a wide arc to an inoperative position remote from said bed and an upright supporting surface engaging the carrier on the side opposite said stud.

In testimony whereof, we have signed our names to this specification.

CHARLES W. H. BLOOD.
CARL G. OSTEMAN.